US012558282B2

(12) United States Patent
Kaiser et al.

(10) Patent No.: US 12,558,282 B2
(45) Date of Patent: Feb. 24, 2026

(54) POWERED RANGE-OF-MOTION DEVICE WITH LINEAR ACTUATOR FOR MOVEMENT OF THE LIMB

(71) Applicant: Physiohab LLC, Sunrise, FL (US)

(72) Inventors: Robert T. Kaiser, West Grove, PA (US); Eduardo M. Marti, Sunrise, FL (US)

(73) Assignee: PHYSIOHAB LLC, Sunrise, FL (US)

( * ) Notice: Subject to any disclaimer, the term of this patent is extended or adjusted under 35 U.S.C. 154(b) by 0 days.

(21) Appl. No.: 19/223,586

(22) Filed: May 30, 2025

(65) Prior Publication Data

US 2025/0367054 A1 Dec. 4, 2025

Related U.S. Application Data

(60) Provisional application No. 63/655,703, filed on Jun. 4, 2024.

(51) Int. Cl.
*A61H 1/02* (2006.01)

(52) U.S. Cl.
CPC ........... *A61H 1/024* (2013.01); *A61H 1/0266* (2013.01); *A61H 1/0277* (2013.01);
(Continued)

(58) Field of Classification Search
CPC ........ A61H 1/02; A61H 1/024; A61H 1/0274; A61H 1/0281; A61H 1/0237;
(Continued)

(56) References Cited

U.S. PATENT DOCUMENTS 2,883,982 A * 4/1959 Rainey .................. A61F 5/0123 602/16
4,310,154 A 1/1982 Kauffman
(Continued)

FOREIGN PATENT DOCUMENTS

WO 2022047398 A1 3/2022

OTHER PUBLICATIONS

Kinetec® Centura™ Shoulder CPM, Global Industrial, downloaded from web page: <https://globalindustrial.com/p/medical-lab/physical-therapy/modalities/shoulder-cpm>, Download date: Aug. 20, 2020, original posting date: unknown, 1 page.
(Continued)

*Primary Examiner* — Justine R Yu
*Assistant Examiner* — Christopher E Miller
(74) *Attorney, Agent, or Firm* — Panitch Schwarze Belisario & Nadel LLP

(57) ABSTRACT

A range-of-motion device for a joint includes first and second link members for securing to a first and a second limb connected by the joint. A flexion-extension actuator drives movement of the second link member with respect to the first link member. An intermediate linkage may engage the first and second link members. A base link may engage the first link member and may be supported by a transverse support member. A vertical support frame may support the transverse support member. The transverse support member may be configured to provide free pivoting within a free-pivoting range of motion of the base link with respect to the transverse support member.

15 Claims, 11 Drawing Sheets

(52) U.S. Cl.
CPC ... *A61H 1/0285* (2013.01); *A61H 2201/0192* (2013.01); *A61H 2201/1215* (2013.01); *A61H 2201/149* (2013.01); *A61H 2201/1664* (2013.01)

(58) Field of Classification Search
CPC .......... A61H 1/0277; A61H 2201/1676; A61F 2005/0139; A61F 2005/0153
USPC ............................................... 601/33, 34, 35
See application file for complete search history.

(56) References Cited

U.S. PATENT DOCUMENTS 4,671,257 A 6/1987 Kaiser et al.
4,691,694 A 9/1987 Boyd et al.
4,825,852 A 5/1989 Genovese et al.
4,834,073 A 5/1989 Bledsoe et al.
4,863,499 A 9/1989 Osendorf
4,869,499 A 9/1989 Schiraldo
4,873,967 A 10/1989 Sutherland
4,890,607 A * 1/1990 Townsend ............. A61F 5/0123 602/26
4,905,676 A 3/1990 Bond et al.
5,052,375 A 10/1991 Stark et al.
5,167,612 A 12/1992 Bonutti
5,179,939 A 1/1993 Donovan et al.
5,209,223 A 5/1993 McGorry et al.
5,213,094 A 5/1993 Bonutti
5,230,696 A * 7/1993 Silver ....................... A61F 5/34 602/26
5,239,987 A 8/1993 Kaiser et al.
5,399,147 A * 3/1995 Kaiser .................. A61H 1/0255 601/16
5,403,251 A 4/1995 Belsito et al.
5,683,351 A 11/1997 Kaiser et al.
5,848,979 A 12/1998 Bonutti et al.
5,951,499 A 9/1999 Saringer et al.
6,007,500 A 12/1999 Quintinskie, Jr.
6,113,562 A 9/2000 Bonutti et al.
6,155,994 A 12/2000 Hubbard et al.
6,267,735 B1 7/2001 Blanchard et al.
6,309,368 B1 * 10/2001 Herzberg .............. A61F 5/0123 602/5
6,669,660 B2 12/2003 Branch
6,695,795 B2 2/2004 Knoll
6,702,768 B2 3/2004 Mano et al.
6,872,186 B2 3/2005 Branch et al.
6,872,187 B1 3/2005 Stark et al.
6,984,197 B2 1/2006 Sugiyama et al.
7,108,664 B2 9/2006 Mason et al.
7,112,179 B2 9/2006 Bonutti et al.
7,204,814 B2 4/2007 Peles
7,452,342 B2 11/2008 Bonutti et al.
7,479,121 B2 1/2009 Branch
7,547,289 B2 6/2009 Branch
7,665,167 B2 2/2010 Branch et al.
7,686,775 B2 3/2010 Branch
7,695,416 B2 4/2010 Weiner
7,874,996 B2 1/2011 Weinstein et al.
7,955,286 B2 6/2011 Bonutti et al.
7,981,067 B2 7/2011 Bonutti et al.
7,985,227 B2 7/2011 Branch et al.
8,012,108 B2 9/2011 Bonutti et al.
8,066,656 B2 11/2011 Bonutti et al.
8,206,329 B2 6/2012 Bonutti et al.
8,273,043 B2 9/2012 Bonutti et al.
8,287,479 B2 10/2012 Bonutti et al.
8,361,002 B2 1/2013 Branch
8,591,441 B2 11/2013 Bonutti et al.
8,591,443 B2 11/2013 Bonutti et al.
8,784,343 B2 7/2014 Bonutti et al.
8,814,816 B2 8/2014 Bonutti et al.
8,840,570 B2 9/2014 Branch et al.
8,905,950 B2 12/2014 Bonutti et al.
8,920,346 B2 12/2014 Bonutti et al.
9,248,041 B2 2/2016 Bonutti et al.
9,289,157 B2 3/2016 Branch et al.
9,314,392 B2 4/2016 Bonutti et al.
9,320,669 B2 4/2016 Bonutti et al.
9,333,107 B2 5/2016 Potter et al.
9,345,606 B2 5/2016 Bonutti et al.
9,408,771 B2 8/2016 Branch et al.
9,445,966 B2 9/2016 Bonutti et al.
9,468,578 B2 10/2016 Bonutti et al.
9,572,702 B2 2/2017 Bonutti et al.
9,610,038 B2 4/2017 Branch et al.
9,669,249 B2 6/2017 Marti et al.
9,744,091 B2 8/2017 Branch et al.
9,744,092 B2 8/2017 Fu et al.
9,814,411 B2 11/2017 Branch et al.
9,873,010 B2 1/2018 Marti et al.
9,931,263 B2 4/2018 Branch et al.
9,980,871 B2 5/2018 Bonutti et al.
10,159,591 B2 12/2018 Bonutti et al.
10,220,234 B2 3/2019 Marti et al.
10,293,198 B2 5/2019 Marti et al.
10,307,319 B2 6/2019 Bonutti et al.
10,383,578 B2 8/2019 Branch et al.
10,456,314 B2 10/2019 Bonutti et al.
10,603,240 B2 3/2020 Branch et al.
10,667,938 B2 6/2020 Bonutti et al.
10,702,734 B2 * 7/2020 Pompile ............. A63B 71/0686
10,765,901 B2 9/2020 Radcliffe et al.
10,779,984 B2 9/2020 Bonutti et al.
10,842,439 B2 11/2020 Branch et al.
11,123,212 B2 9/2021 Bonutti et al.
11,161,002 B2 11/2021 Radcliffe et al.
11,712,389 B1 8/2023 Branch et al.
2005/0197605 A1 9/2005 Bonutti et al.
2005/0202943 A1 9/2005 Branch et al.
2005/0273022 A1 12/2005 Diaz et al.
2007/0062987 A1 3/2007 Murakami
2007/0265634 A1 11/2007 Weinstein
2008/0188356 A1 * 8/2008 Bonutti ................. A61F 5/0125 482/96
2009/0137369 A1 5/2009 Branch et al.
2009/0143708 A1 6/2009 Branch
2009/0264799 A1 10/2009 Bonutti et al.
2010/0010396 A1 1/2010 Branch
2010/0229874 A1 9/2010 Branch
2010/0288802 A1 11/2010 Sakanishi
2011/0166489 A1 7/2011 Angold et al.
2012/0143103 A1 6/2012 Branch et al.
2013/0060171 A1 3/2013 Fu et al.
2013/0237883 A1 * 9/2013 Malosio ............... A61H 1/0281 601/33
2014/0094721 A1 4/2014 Diallo
2014/0358042 A1 12/2014 Branch et al.
2015/0286117 A1 10/2015 Sung et al.
2015/0297934 A1 10/2015 Agrawal et al.
2015/0351990 A1 12/2015 Ewing
2015/0360069 A1 * 12/2015 Marti ................. A63B 23/1272 482/7
2017/0347963 A1 12/2017 Branch et al.
2018/0133545 A1 * 5/2018 Marti ..................... A63B 23/08
2018/0333096 A1 11/2018 Branch et al.
2018/0333318 A1 11/2018 Branch et al.
2019/0111299 A1 4/2019 Radcliffe et al.
2019/0192370 A1 6/2019 Branch et al.
2019/0343705 A1 11/2019 Bonutti et al.
2019/0365329 A1 12/2019 Branch et al.
2021/0038417 A1 2/2021 Marti
2021/0038940 A1 2/2021 Marti
2021/0038941 A1 2/2021 Marti
2022/0175567 A1 6/2022 Bonutti et al.
2022/0331188 A1 * 10/2022 Stinton ................ A61H 1/0277
2023/0165744 A1 * 6/2023 Kaiser .................. A61H 1/0281 601/5
2023/0270613 A1 8/2023 Dan et al.
2024/0065917 A1 * 2/2024 Stinton ................ A61H 1/0285
2024/0216741 A1 * 7/2024 Branch ................ A61H 1/0281

(56) References Cited

U.S. PATENT DOCUMENTS

OTHER PUBLICATIONS

DJO Global OptiFlex S Shoulder CPM Unit, DJO Global, downloaded from web page: <https://4mdmedical.com/catalog/product/view/id/284372/?CAWELAID=120141310000056386>, Download date: Aug. 20, 2020, original posting date: unknown, 2 pages.

* cited by examiner

POWERED RANGE-OF-MOTION DEVICE WITH LINEAR ACTUATOR FOR MOVEMENT OF THE LIMB

CROSS-REFERENCE TO RELATED APPLICATIONS

The present application claims the benefit of U.S. Provisional Patent Application No. 63/655,703, filed on Jun. 4, 2024. The application cited in this paragraph is hereby incorporated into the present application by reference.

BACKGROUND OF THE DISCLOSURE

The present disclosure relates generally to a powered range-of-motion device with a linear actuator for moving or exercising a limb and/or a connected joint such as an elbow, a knee, an ankle, or a wrist of a user, and configurable for aligning with the joint for moving or exercising the same. The present disclosure also relates to a system including such a powered range-of-motion device and a method for using such a device. The present disclosure more particularly relates to such a device for imposing a variety of conditions, including but not limited to stretching conditions or movement across a selected range of motion, upon such a joint.

SUMMARY OF THE DISCLOSURE

Briefly stated, a first example of a range-of-motion device is provided for treating a joint of an elbow, a knee, an ankle, or a wrist of a body by engaging a first limb and a second limb connected by the joint. In some embodiments, the range-of-motion device includes a first link member configured to engage the first limb, the first link member having a proximal end portion and a distal end portion. The distal end portion has a distal gear portion. A second link member is configured to engage the second limb, the second link member having a proximal end portion and a distal end portion. An intermediate linkage is operatively engaged with both the first link member and the second link member. The intermediate linkage includes a main shaft non-rotatably attached to the distal gear portion of the first link member such that the main shaft and the distal gear portion are aligned along a main axis. A main intermediate link is rotatably attached to the main shaft. The main intermediate link includes a guide track. A bridge shaft is rotatably mounted with respect to the main intermediate link. A bridge link is non-rotatably mounted with respect to the bridge shaft to rotate with the bridge shaft. The bridge link has a bridge-link geared portion operatively engaged with the distal gear portion of the first link member and a bridge-link sliding portion. The bridge-link sliding portion slidably engages the second link member. A flexion-extension actuator is operatively engaged with the first link member and the intermediate linkage to drive movement of the second link member with respect to the first link member.

In any embodiment of the range-of-motion device, the proximal end portion of the second link member may include a track follower operatively engaging the guide track and a second-link sliding portion operatively engaging the bridge-link sliding portion.

In any embodiment of the range-of-motion device, the distal gear portion may be integrally formed at the proximal end portion of the first link member.

In any embodiment of the range-of-motion device, the guide track may include a track slot formed in the main intermediate link, and the track follower may include a track-follower projection movable within the track slot. The track slot may be configured to move the second link member radially as the bridge link and the second link member rotate with the bridge link.

In any embodiment of the range-of-motion device, the bridge link may include a bridge-link slot, and the second-link sliding portion of the second link member may include a distal projection slidably engaging the bridge-link slot.

In any embodiment of the range-of-motion device, the bridge link may include a bridge-link slot, and the second-link sliding portion may include a projection slidably engaging the bridge-link slot.

In any embodiment of the range-of-motion device, the flexion-extension actuator may be a linear actuator having a first end portion pivotably attached to the first link member and a second end portion pivotably attached to the main intermediate link to drive the main intermediate link in pivoting movement with respect to the main shaft.

In any embodiment of the range-of-motion device, a support assembly may be operatively engaged with the first link member to support the first link member for free pivoting within a free-pivoting range of motion with respect to the support assembly. The support assembly may include a vertical support frame and a ground-engaging base supporting the vertical support frame in an upright orientation.

In any embodiment of the range-of-motion device, a base link may be adjustably securable to the first link member; and a support assembly may be operatively engaged with the base link. The support assembly may include a transverse support member operatively engaged with the base link to provide support thereto. A vertical support frame may support the transverse support member, and a ground-engaging base may support the vertical support frame in an upright orientation. The transverse support member may be configured to provide free pivoting within a free-pivoting range of motion of the base link with respect to the transverse support member.

In any embodiment of the range-of-motion device, the transverse support member may include a support collar non-rotatably secured to the transverse support member and having a support-collar slot. The base link may be pivotably mounted on the transverse support member. The base link may include a base-link projection engaged with and movable within the support-collar slot so that the base link can pivot within a pivoting range of motion limited by a range of motion of the base-link projection within the support-collar slot.

In any embodiment of the range-of-motion device, the vertical support frame may include a lower vertical member operatively engaged with the ground-engaging base. An upper vertical member may be slidably engaged with the lower vertical member. A raising-lowering actuator may be operatively engaged with the lower vertical member and the upper vertical member to extend and retract the upper vertical member with respect to the lower vertical member.

In any embodiment of the range-of-motion device, the vertical support frame may be configured to be removably securable to the ground-engaging base in a first orientation and in a second orientation with respect to the ground-engaging base. The first orientation and the second orientation differ in being rotated with respect to a vertical axis by 180 degrees, so that the vertical support frame and the transverse support member together may be selectably placed in the first orientation or the second orientation with respect to the ground-engaging base. In any embodiment of the range-of-motion device, a first limb-support platform may be releasably securable to the first link member to extend from either a first side or an opposite second side thereof, so that the first limb-support platform is securable to extend opposite the vertical support frame in the first orientation and is securable to extend opposite the vertical support frame in the second orientation; and a second limb-support platform may be releasably securable to the second link member to extend from either a first side or an opposite second side thereof, so that the first limb-support platform is securable to extend opposite the vertical support frame in the first orientation and is securable to extend opposite the vertical support frame in the second orientation.

In any embodiment of the range-of-motion device, a first limb-support platform may be releasably securable to the first link member; and a second limb-support platform may be releasably securable to the second link member.

In any embodiment of the range-of-motion device, a first limb-support platform may be releasably securable to the first link member to extend from either a first side or an opposite second side thereof, so that the first limb-support platform is securable to extend opposite the vertical support frame in the first orientation and is securable to extend opposite the vertical support frame in the second orientation. A second limb-support platform may be releasably securable to the second link member to extend from either a first side or an opposite second side thereof, so that the first limb-support platform is securable to extend opposite the vertical support frame in the first orientation and is securable to extend opposite the vertical support frame in the second orientation.

In another aspect, a second example of a range-of-motion device may be provided for treating a joint of an elbow, a knee, an ankle, or a wrist of a body by engaging a first limb and a second limb connected by the joint. The range-of-motion device includes a first link member configured to engage the first limb, the first link member having a proximal end portion and a distal end portion. A second link member is configured to engage the second limb. A flexion-extension actuator is operatively engaged with the first link member and the intermediate linkage to drive movement of the second link member with respect to the first link member. A base link is adjustably securable to the first link member. A support assembly is operatively engaged with the base link, and includes a transverse support member operatively engaged with the base link to provide support thereto. A vertical support frame supports the transverse support member; and a ground-engaging base supports the vertical support frame in an upright orientation. The transverse support member is configured to provide free pivoting within a free-pivoting range of motion of the base link with respect to the transverse support member.

In some embodiments, the transverse support member may include a transverse support member and a support collar non-rotatably secured to the transverse support member and having a support-collar slot. The base link may be pivotably mounted with respect to the transverse support member. The base link may include a base-link projection engaged with and movable within the support-collar slot so that the base link can pivot within a pivoting range of motion limited by a range of motion of the base-link projection within the support-collar slot. The vertical support frame may be configured to be removably securable to the ground-engaging base in a first orientation and in a second orientation with respect to the ground-engaging base, the first orientation and the second orientation differing in being rotated with respect to a vertical axis by 180 degrees. The vertical support frame and the transverse support member together may be selectably placed in the first orientation or the second orientation with respect to the ground-engaging base. The range-of-motion device may further comprise a first limb-support platform releasably securable to the first link member to extend from either a first side or an opposite second side thereof, so that the first limb-support platform is securable to extend opposite the vertical support frame in the first orientation and is securable to extend opposite the vertical support frame in the second orientation. A second limb-support platform may be releasably securable to the second link member to extend from either a first side or an opposite second side thereof, so that the first limb-support platform is securable to extend opposite the vertical support frame in the first orientation and is securable to extend opposite the vertical support frame in the second orientation.

BRIEF DESCRIPTION OF THE SEVERAL VIEWS OF THE DRAWINGS

The following detailed description will be better understood when read in conjunction with the appended drawings. For the purpose of illustrating the invention, there are shown in the drawings various embodiments, including embodiments which may be presently preferred. It should be understood, however, that the invention is not limited to the precise arrangements and instrumentalities shown. In the drawings.

DETAILED DESCRIPTION

Figure 1:
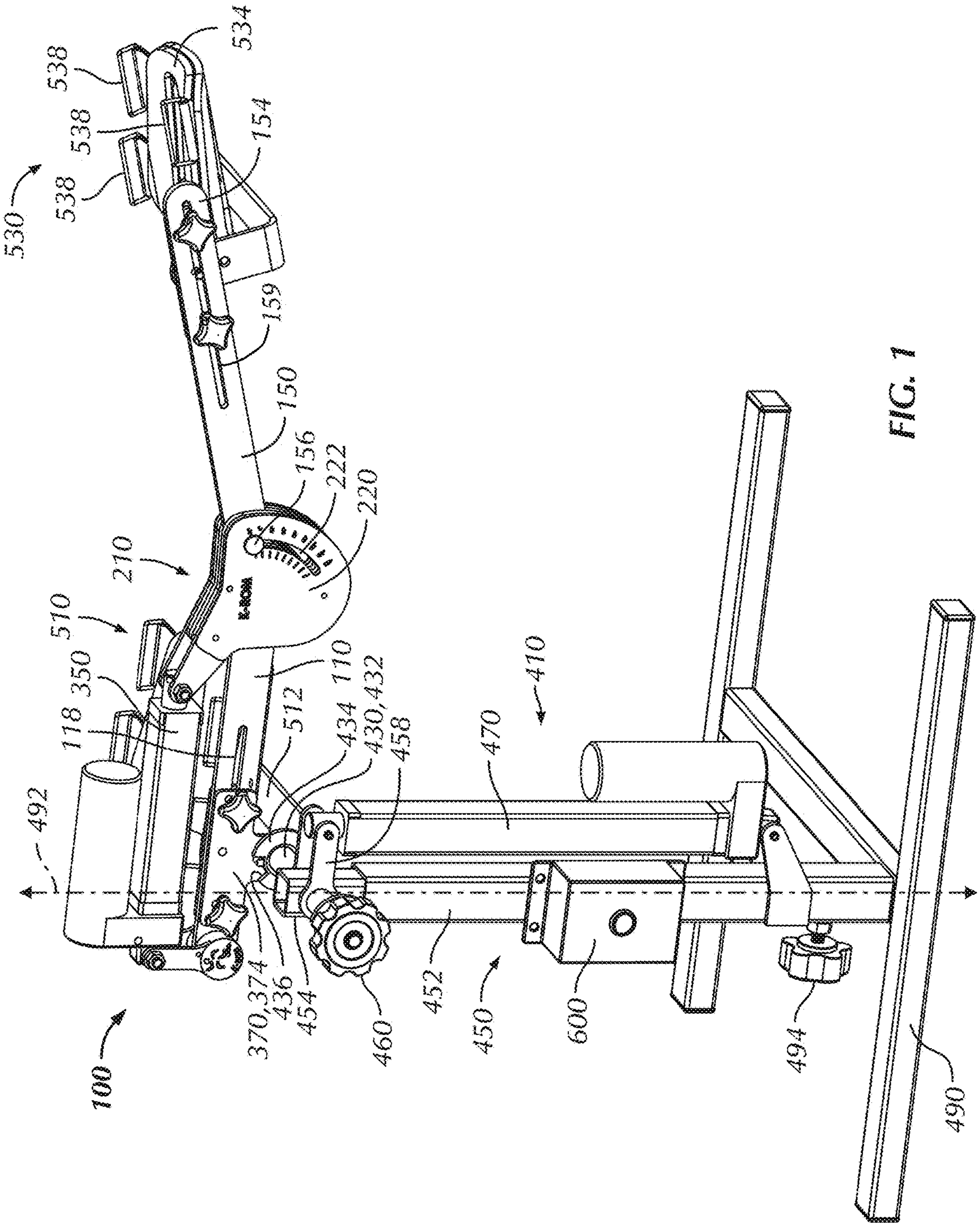
FIG. 1 is a right front perspective view of a range-of-motion device, configured to manipulate right-side joint of a user, in an extended configuration, according to a first embodiment of the present disclosure.

Certain terminology is used in the following description for convenience only and is not limiting. The words “right,” “left,” “lower,” and “upper” designate directions in the drawings to which reference is made. The words “inner” and “outer” refer to directions toward and away from, respectively, the geometric center of an object and designated parts thereof. Unless specifically set forth otherwise herein, the terms “a,” “an,” and “the” are not limited to one element but instead should be read as meaning “at least one.” “At least one” may occasionally be used for clarity or readability, but such use does not change the interpretation of “a,” “an,” and “the.” Moreover, the singular includes the plural, and vice versa, unless the context clearly indicates otherwise. As used herein, the terms “proximal” and “distal” are relative terms referring to locations or elements that are closer to (proximal) or farther from (distal) with respect to other elements, the user, or designated locations. “Including” as used herein means “including but not limited to.” The word “or” is inclusive, so that “A or B” encompasses A and B, A only, and B only. The terms “about,” “approximately,” “generally,” “substantially,” and like terms used herein, when referring to a dimension or characteristic of a component, indicate that the described dimension/characteristic is not a strict boundary or parameter and does not exclude minor variations therefrom that are functionally similar. At a minimum, such references that include a numerical parameter would include variations that, using mathematical and industrial principles accepted in the art (e.g., rounding, measurement or other systematic errors, manufacturing tolerances, etc.), would not vary the least significant digit thereof. The terminology set forth in this paragraph includes the words noted above, derivatives thereof, and words of similar import. The devices and methods disclosed herein are disclosed as imposing a movement or a load upon a joint of an elbow, a knee, an ankle, or a wrist of a user. From the standpoint of the disclosed devices and methods, any mechanism, configuration, or step involving imposing a desired load is interchangeable with the same mechanism, configuration, or step used to impose a desired movement; and any mechanism, configuration, or step involving imposing a desired movement is interchangeable with the same mechanism, configuration, or step used to impose a desired load.

Figure 4:
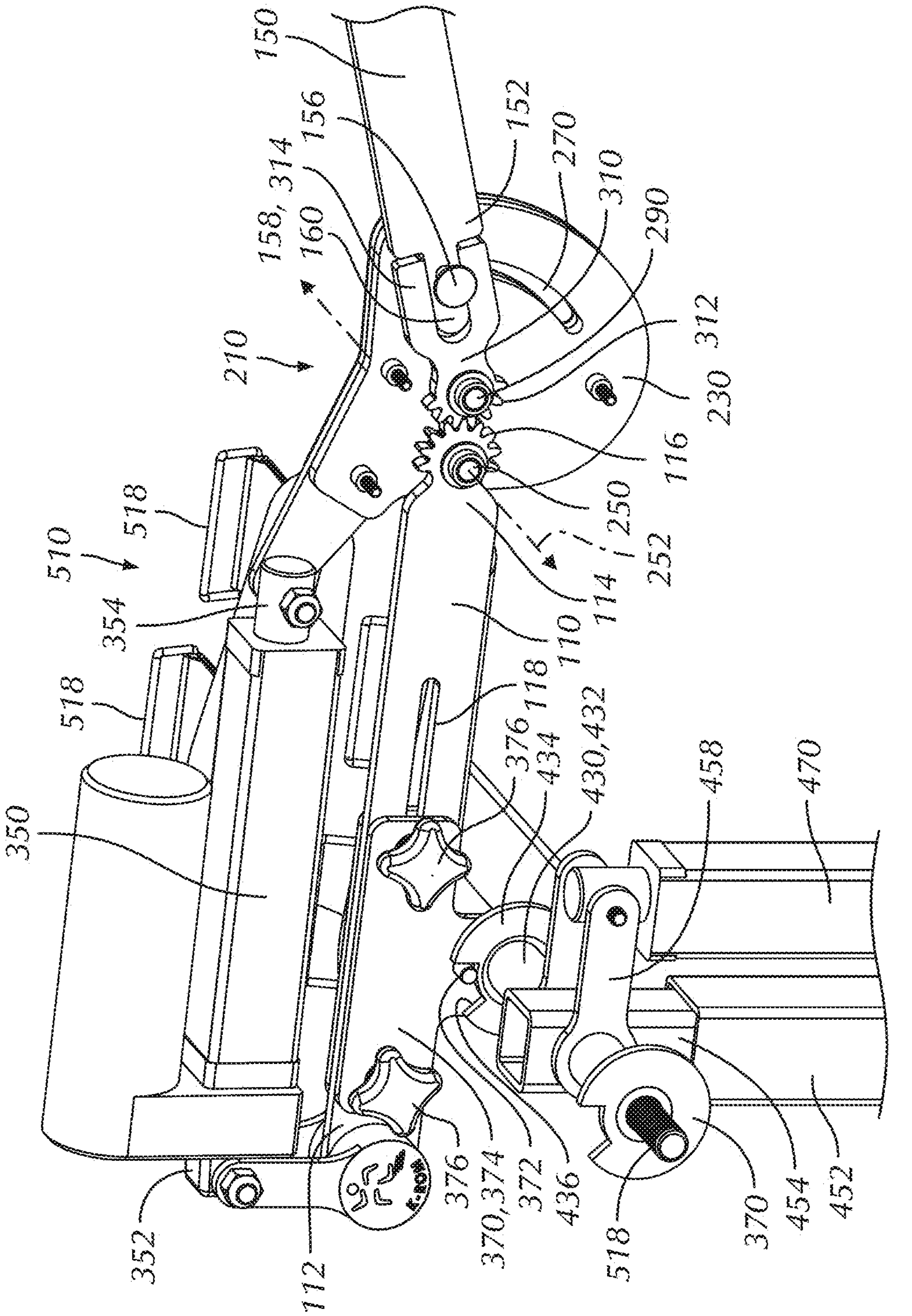
FIG. 4 is a partial right front perspective cutaway view of the range-of-motion device of FIG. 1 in the configuration of FIG. 1.
Figure 5:
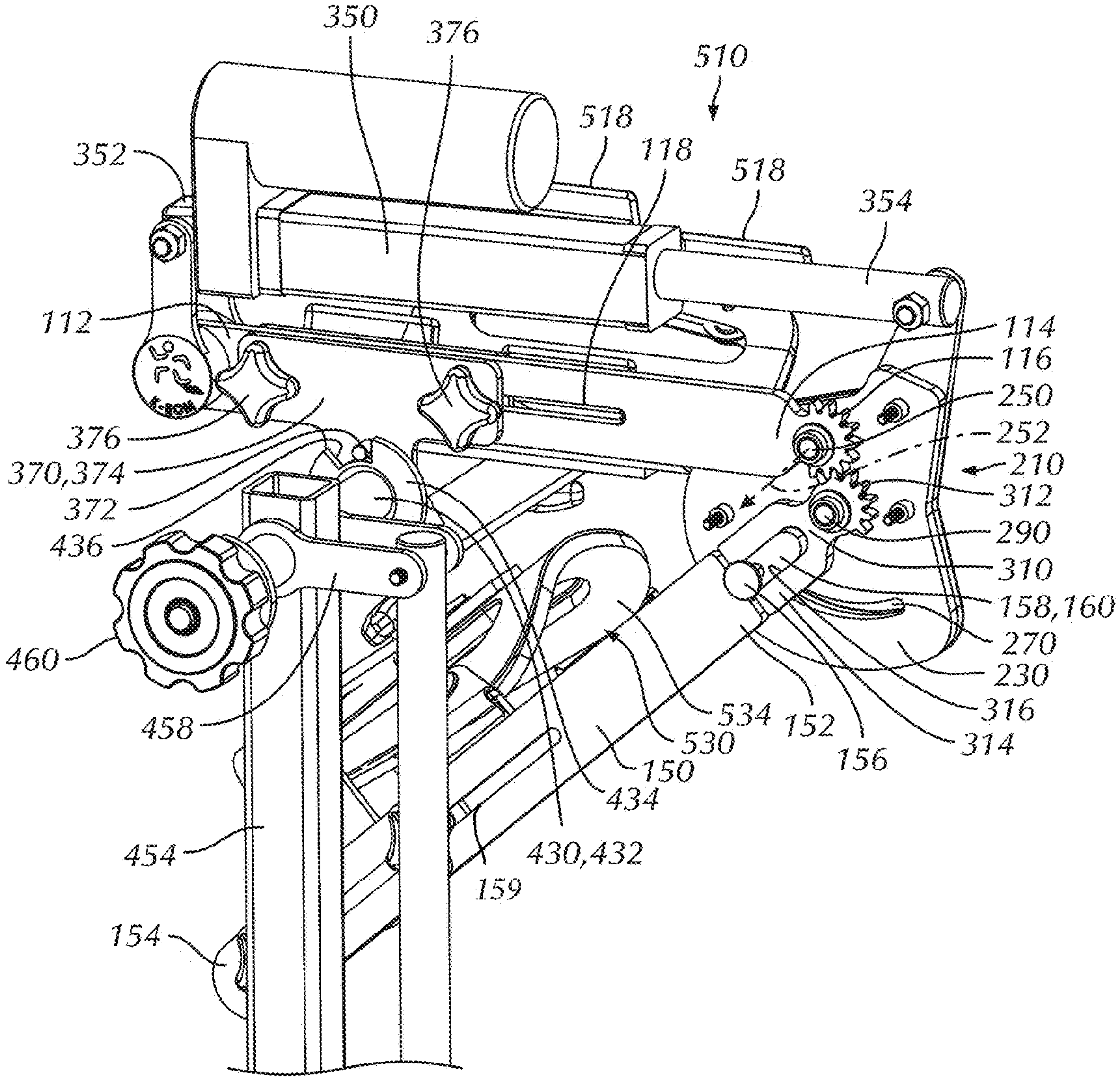
FIG. 5 is a partial right front perspective cutaway view of the range-of-motion device as in FIG. 4, but in a flexed configuration.
Figure 6:
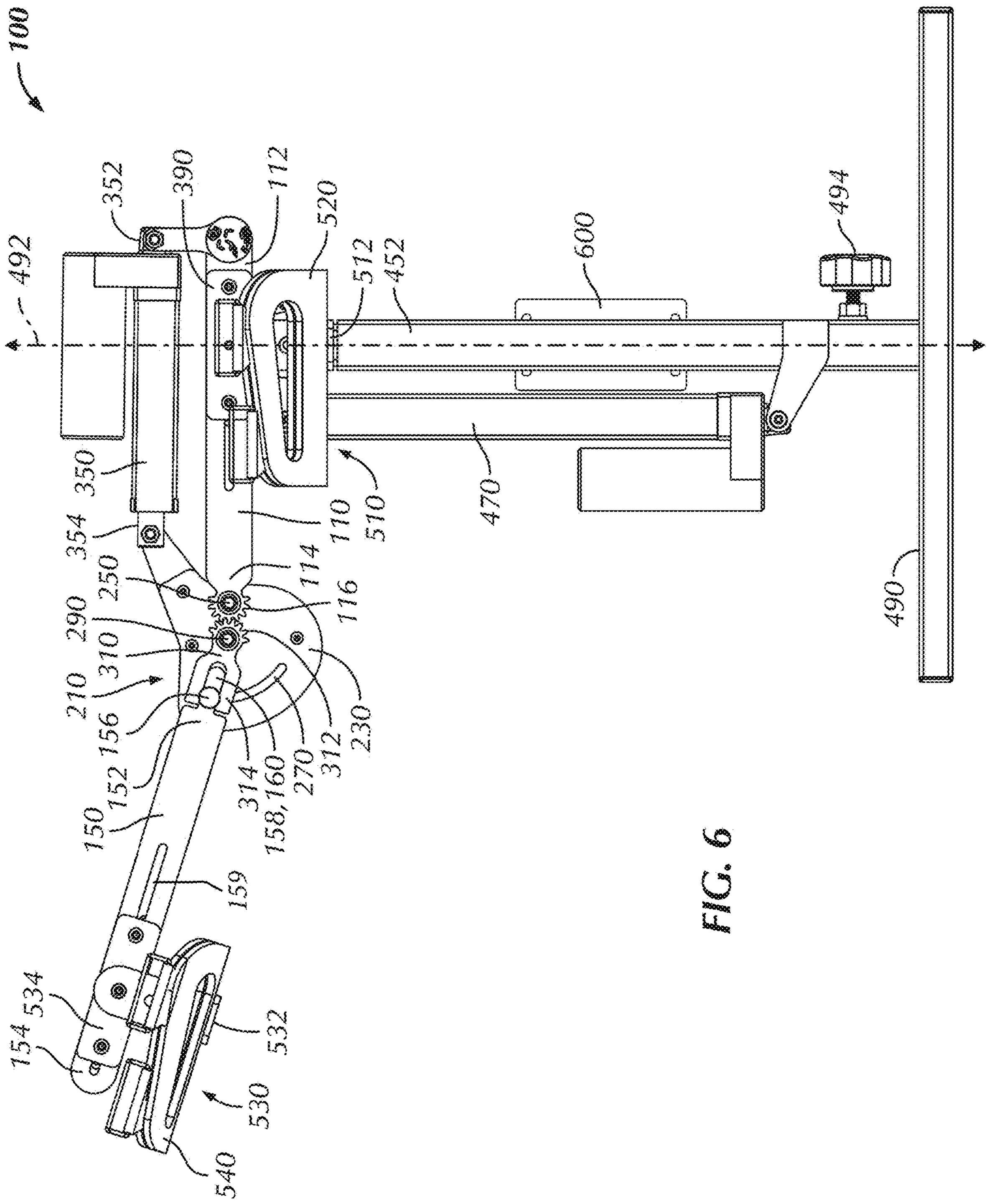
FIG. 6 is a left side elevational cutaway view of the range-of-motion device of FIG. 1 in the configuration of FIG. 1.
Figure 7:
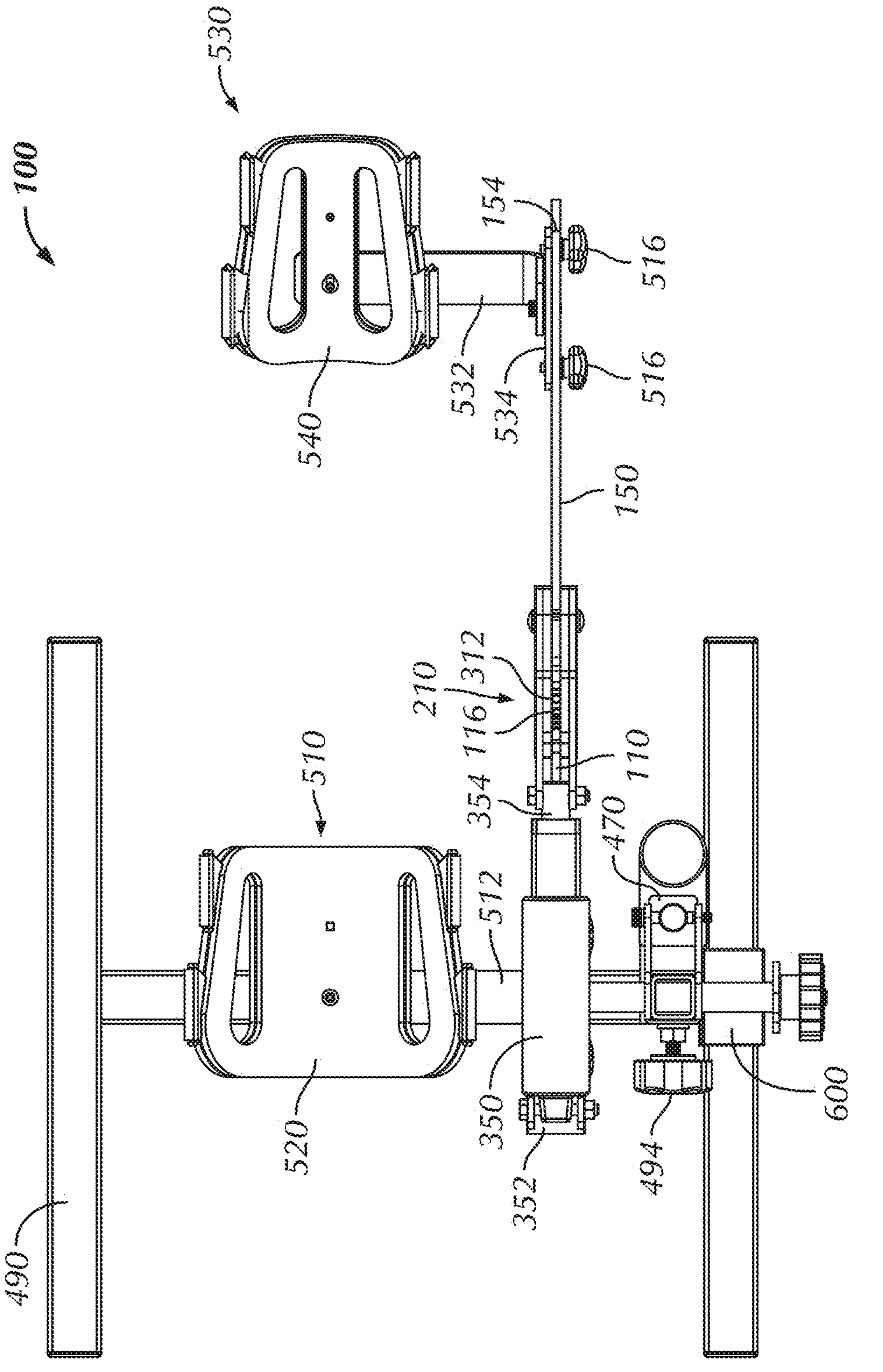
FIG. 7 is a top plan view of the range-of-motion device of FIG. 1 in the configuration of FIG. 1, with certain elements omitted to review internal parts thereof.

Moving on to the example devices shown in the drawings, in some embodiments, referring to FIGS. 1 through 11, a range-of-motion device 100 is disclosed for treating a joint of an elbow, a knee, an ankle, or a wrist of a body by engaging a first limb and a second limb connected by the joint. The illustrated embodiments are particularly adapted to treatment of a knee joint of a body. In the illustrated embodiment, the range-of-motion device 100 includes a first link member 110 configured to engage the first limb of the body of a patient; the first limb may be the upper leg or thigh. As best seen in FIGS. 6 and 7, the first link member 110 is operatively connected to a proximal pad 520, which has loops 518 for straps, bands, belts, or the like (not shown), which may be operatively connected to secure a limb of a user to the first link member 110.

Referring to FIGS. 4-6, the first link member 110 has a proximal end portion 112 and a distal end portion 114. The distal end portion 114 has a distal gear portion 116. The distal gear portion 116 is formed integrally on the distal end portion 114; alternatively, a gear or a mutilated gear, or another body carrying gear teeth, may be attached to the distal end portion 114. Alternatively, the distal gear portion 116 may include a gear element formed separately from the first link member 110 and non-rotatably mounted with respect to the main shaft 250, as by being bolted, welded, adhered, or otherwise fixed thereto.

Figure 11:
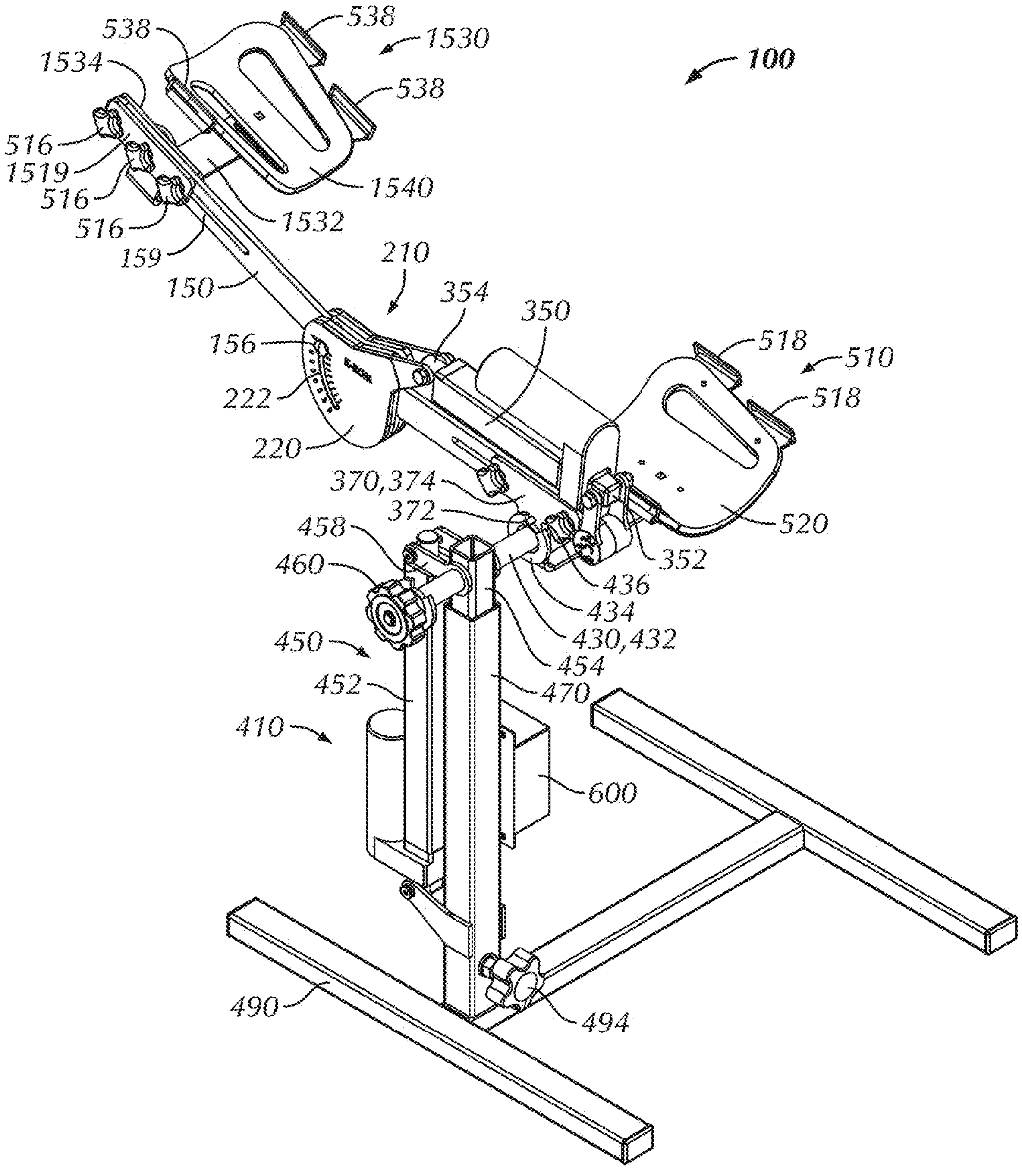
FIG. 11 is a right front perspective view of the range-of-motion device of FIG. 1 in an extended configuration as in FIGS. 1, but configured to manipulate a left-side joint of the user, and equipped with an alternative limb-support platform.

A second link member 150 is configured to engage the second limb of the body of the user, which may be the lower leg of the user. The second link member 150 has a proximal end portion 152 and a distal end portion 154. As best seen in FIGS. 6 and 7, the second link member 150 is operatively connected to second limb-support platform 530 including a distal pad 540 with loops 538 for straps, bands, belts, or the like (not shown) configured be operatively connected to secure a limb of a user to the second link member 150. The second limb-support platform 530 has a horizontal support 532 connected to a sliding support 534, which is secured by a bolt passing through a slot 159 of the second link member 150, with each bolt tightened by a knob 516. FIG. 11 shows an alternative embodiment of a second limb-support platform 1530. A horizontal support 1532 supports a distal pad 1540. A sliding support 1534 is attached to a backing plate 1519 by bolts passing through both the sliding support 1534 and a backing plate 1519, with each bolt configured to be tightened by a knob 516.

Figure 8:
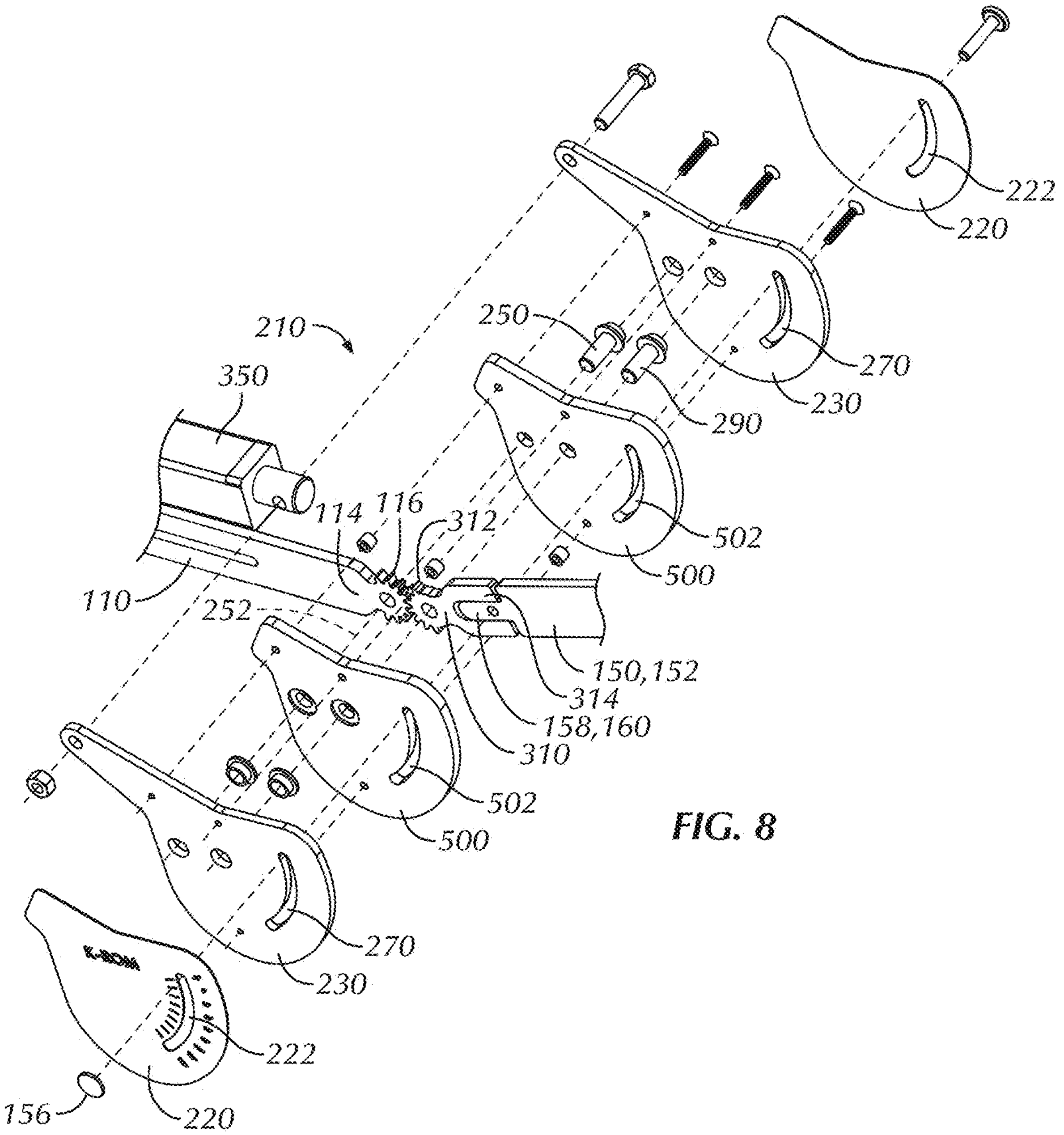
FIG. 8 is an exploded detail view of the range-of-motion device of FIG. 1 in the configuration of FIG. 1.

An intermediate linkage 210 is operatively engaged with both the first link member 110 and the second link member 150; the operative engagement may be direct (as shown) or indirect. Referring to FIGS. 4-6 and FIG. 8, the intermediate linkage 210 includes a main shaft 250 non-rotatably attached to the distal gear portion 116 of the first link member 110 such that the main shaft 250 and the distal gear portion 116 are aligned along a main axis 252 (FIGS. 4 and 5). A main intermediate link 230 (two are shown in FIG. 8) is rotatably attached to the main shaft 250. The main intermediate link 230 includes a guide track in the form of a track slot 270; the guide track may alternatively be configured as a projection from a surface of the main intermediate link 230. A bridge shaft 290 is rotatably mounted with respect to the main intermediate link 230 and revolves around the main shaft 250. A bridge link 310 is non-rotatably mounted with respect to the bridge shaft 290 to rotate with the bridge shaft 290. Rotation of the main intermediate link 230 about the main shaft 250 drives the bridge link 310 to revolve around the main shaft 250. The bridge link 310 has a bridge-link geared portion 312 operatively engaged with the distal gear portion 116 of the first link member 110. As the bridge link 310 revolves around the main shaft 250, the bridge-link geared portion 312 meshes with the distal gear portion 116, causing the bridge link 310 to rotate while revolving about the main shaft 250. A bridge-link sliding portion slidably engages the second link member 150 at the proximal end portion 152. In the illustrated embodiment, the bridge-link sliding portion comprises legs 314 forming a bridge-link slot 316 compatible with a second-link sliding portion 158. The second-link sliding portion 158 includes or takes the form of a distal projection 160 slidably engaging the bridge-link slot 316. The proximal end portion 152 of the second link member 150 includes a track follower in the form of a track-follower projection 156 operatively engaging the guide track (the track slot 270) and a second-link sliding portion 158 operatively engaging the bridge-link sliding portion (the bridge-link slot 316). In some embodiments, the bridge link includes a bridge-link slot 316, and the second-link sliding portion 158 of the second link member 150 includes a distal projection 160 slidably engaging the bridge-link slot 316. Engagement between the bridge-link sliding portion (the bridge-link slot 316) and the second-link sliding portion 158 causes the second link member 150 to rotate with the bridge link 310, while the guide track may cause the second link member 150 to move radially with respect to the main shaft 250 and the main axis 252, which may impose a corresponding movement and/or a force on the joint. In some embodiments the guide track may take the form of a track slot 270 formed in the main intermediate link 230 as shown, and the track follower may take the form of a track-follower projection 156 operatively engaging with and movable within the track slot 270 or guide track as shown. The track slot 270 or guide track may be configured to move the second link member 150 radially as the bridge link 310 and the second link member 150 rotate with the bridge link, with a curved path of the track slot 270 causing the track-follower projection 156 to move in a radial direction with respect to the main axis 252 and the main shaft 250 as the track-follower projection 156 traverses the track slot 270.

Referring to FIG. 8, the main intermediate link 230 and connected components are arranged as follows. An outer cover 220 with a slot 222 and marking corresponding to a degree of flexion or extension is provided on each side of the device; thus two of the outer cover 220 are shown. Inwardly from each outer cover 220 is a main intermediate link 230 with a track slot 270. Inwardly from each main intermediate link 230 is a resilient liner 500 with a slot 502. Each resilient liner is formed from polyurethane, plastic, or other suitable resilient material for absorbing vibrations and preventing or reducing clashing of main intermediate link 230 with first link member 110 and second link member 150.

A flexion-extension actuator 350 is operatively engaged with the first link member 110 and the intermediate linkage 210 to drive movement of the second link member 150 with respect to the first link member 110. The flexion-extension actuator 350 and any other actuator disclosed herein may be any conventional linear actuator capable of moving two elements with respect to one another—for example, a linear actuator of any of the following types: screw-based, rack-and-pinion, chain-and-sprocket, belt-and-pulley, cable-and-pulley, high-torque gear-motor, hydraulic, pneumatic, or solenoid-type actuators. In the illustrated embodiment, screw-and-nut linear actuators of various sizes are used. In the illustrated embodiment, the flexion-extension actuator 350 is a linear actuator having a first end portion 352 pivotably attached to the first link member 110 and a second end portion 354 pivotably attached to the main intermediate link 230 to drive the main intermediate link 230 in pivoting movement with respect to the main shaft 250. The flexion-extension actuator 350 is operatively engaged with the first link member 110 an intermediate linkage to drive movement of the second link member 150 with respect to the first link member 110.

Figure 2:
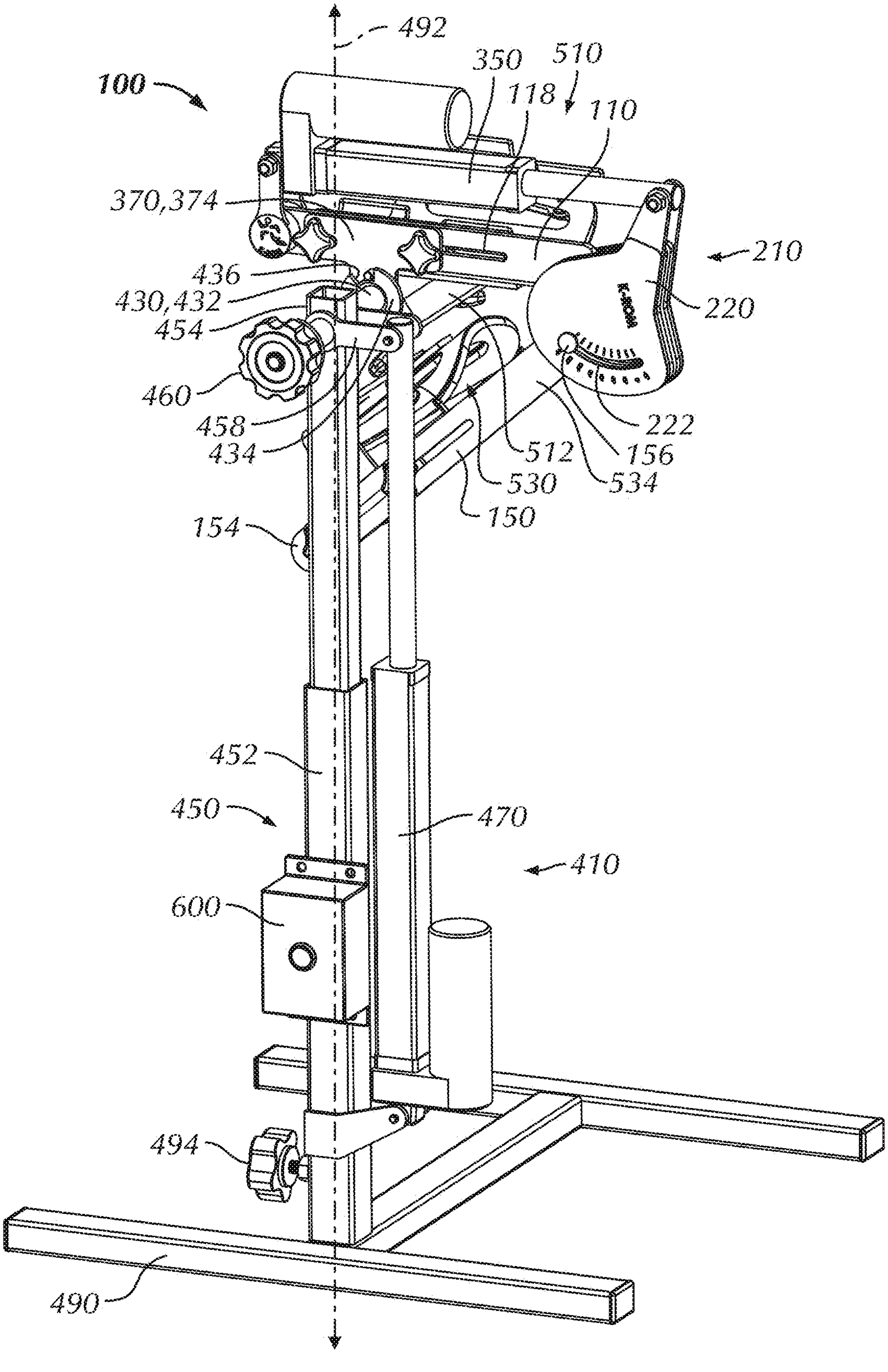
FIG. 2 is a right front perspective view of the range-of-motion device as in FIG. 1, but in a flexed configuration.
Figure 3:
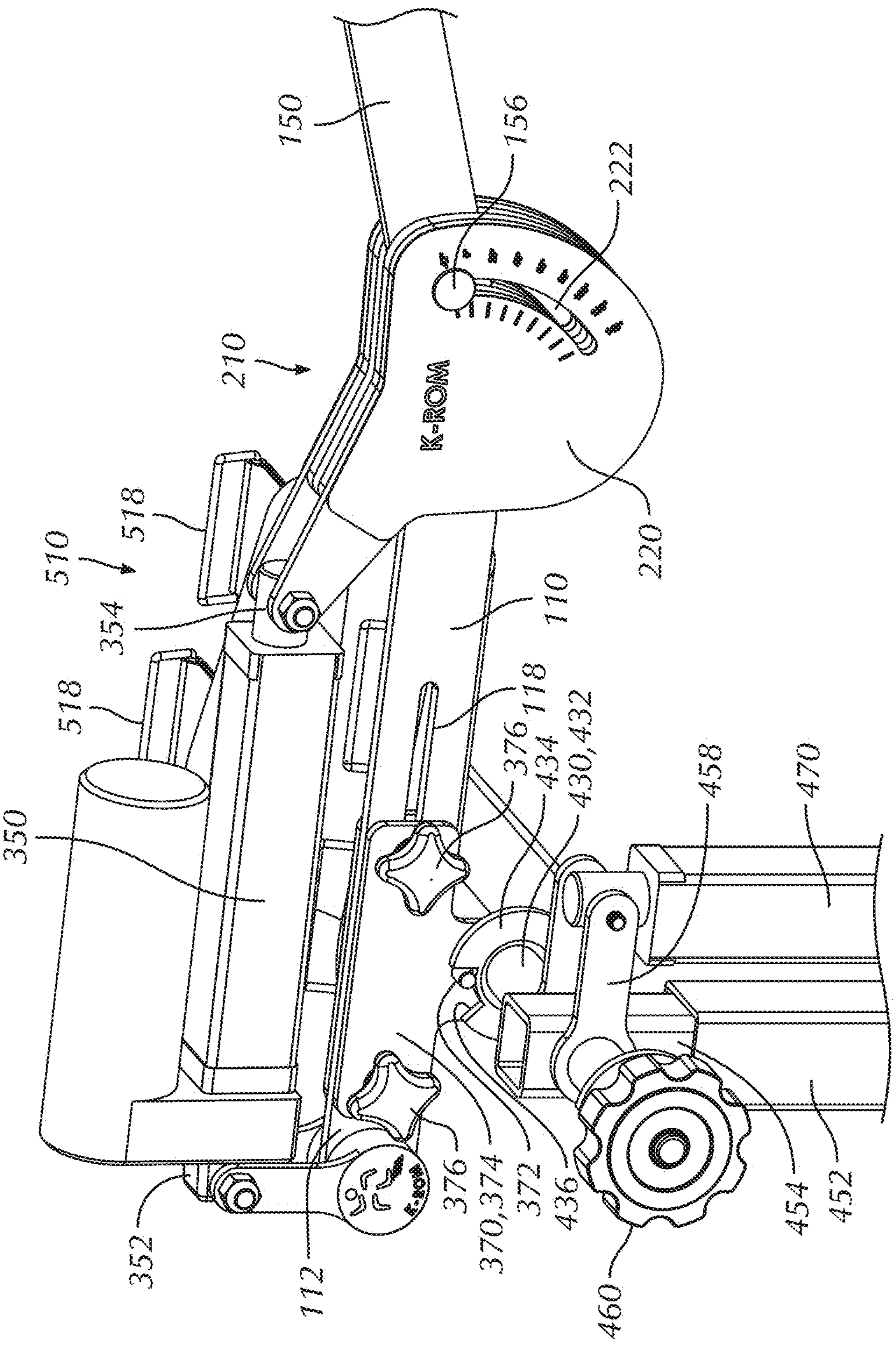
FIG. 3 is a partial right front perspective view of the range-of-motion device of FIG. 1 in the configuration of FIG. 1.

Referring to FIGS. 1 and 2, in some embodiments, a support assembly 410 may be operatively engaged with the first link member 110 to support the first link member 110 for free pivoting within a free-pivoting range of motion with respect to the support assembly 410. The support assembly 410 may include a vertical support frame 450 and a ground-engaging base 490 supporting the vertical support frame in an upright orientation. A bolt configured to be tightened by a knob 494 secures the vertical support frame 450 to the ground-engaging base 490. The ground-engaging base 490 has an upward portion configured to support the vertical support frame 450 in a first orientation and a second orientation, as discussed below. In some embodiments, a base link 370 is adjustably securable to the first link member 110. The support assembly 410 is operatively engaged with the base link 370 to provide support thereto. The base link 370 may be secured by a pair of bolts extending through a slot 118 of the first link member 110 and engaging a backing plate 390 (FIG. 5); the bolts may have attached knobs 376 (FIGS. 3-5) for tightening and loosening thereof. The support assembly 410 may further include a transverse support member 430, and the transverse support member 430 may take the form of or include a tubular body such as a tubular shaft 432 operatively engaged with the base link 370 to provide support thereto. The vertical support frame 450 may in turn support the transverse support member 430 or tubular shaft 432, with the ground-engaging base 490 supporting the vertical support frame 450 in the upright orientation.

Figure 9:
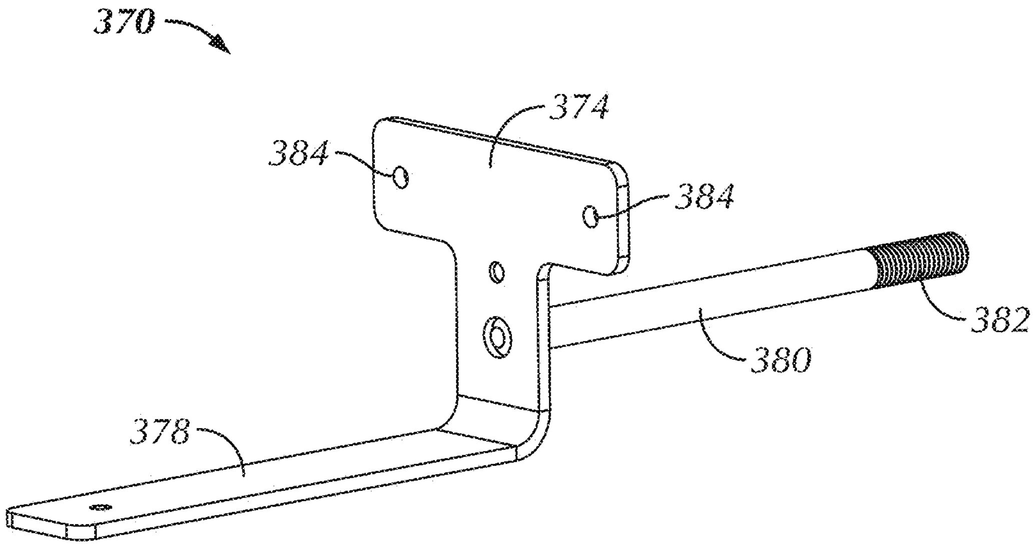
FIG. 9 is a right front perspective view of a limb-support platform of the range-of-motion device of FIG. 1.
Figure 10:
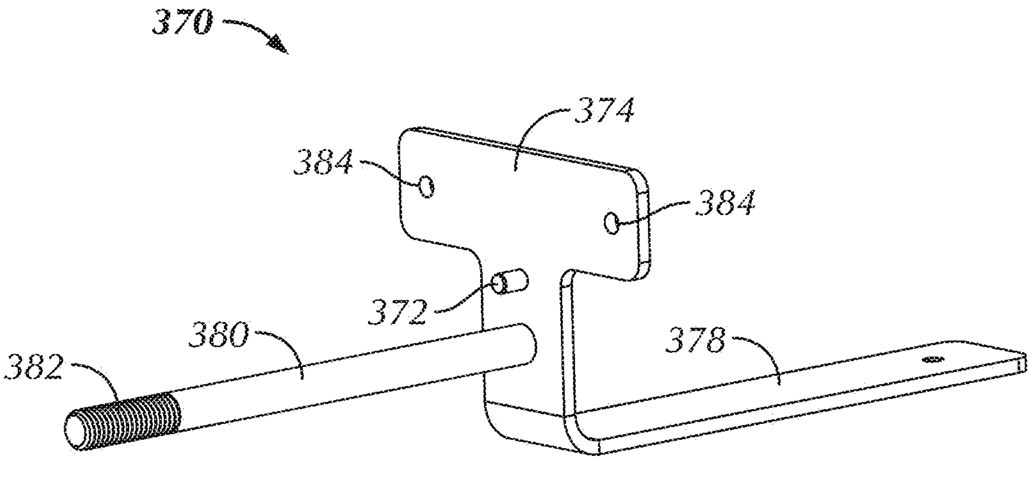
FIG. 10 is a left front perspective view of the limb-support platform of the range-of-motion device of FIG. 9.

In some embodiments, the transverse support member 430 is configured to provide free pivoting within a free-pivoting range of motion of the base link 370 with respect to the transverse support member 430 or the tubular shaft 432. As best seen in FIGS. 4 and 5, in some embodiments, the transverse support member 430 includes the tubular shaft 432 and a support collar 434 (two are shown) non-rotatably secured to the tubular shaft 432 and having a support-collar slot 436. The tubular shaft 432 also has a yoke 458 (two are shown) attaching the transverse support member 430 to the upper vertical member so that a raising-lowering actuator 470 (discussed below) may extend and contract to control the height of the transverse support member 430. The base link 370 may be pivotably mounted with respect to the transverse support member 430. The base link 370 includes a base-link projection 372 engaged with and movable within the support-collar slot 436 so that the base link 370 can pivot within a free-pivoting range of motion limited by a range of motion of the base-link projection 372 within the support-collar slot 436. As a result, bridge shaft 290 and the attached the second link member 150 and not located in a fixed location and instead are movable within the free-pivoting range of motion. Referring to FIGS. 9 and 10, the base link 370 includes a main body 374. The main body 374 may have holes 384 allowing the base link 370 to be secured to the backing plate 390 and thereby to be secured to the first link member 110 for sliding movement with respect to the slot 118 thereof, as noted above. The shaft 380 is attached to the main body 374 and, when the range-of-motion device 100 is assembled, the shaft 380 passes through the tubular shaft 432 to be supported and located thereby. Threads 382 on the shaft 380 cooperate with a knob 460 to secure the shaft 380 within the tubular shaft 432. A support plate 378 extends opposite the shaft 380 and supports the proximal pad 520.

Referring to FIGS. 1 and 2, in some embodiments, the vertical support frame 450 includes a lower vertical member 452 operatively engaged with the ground-engaging base 490. An upper vertical member 454 may be slidably engaged with the lower vertical member 452. A raising-lowering actuator 470 may extend and contract be operatively engaged with the lower vertical member 452 and the upper vertical member 454 to extend and retract the upper vertical member 454 with respect to the lower vertical member 452, thus raising and lowering the support assembly 410, the first link member 110, the second link member 150, and elements connected thereto. The raising-lowering actuator 470 may be any suitable linear actuator, including those described above.

In some embodiments, the vertical support frame 450 is configured to be removably securable to the ground-engaging base 490 in a first orientation and in a second orientation with respect to the ground-engaging base 490. The first orientation and the second orientation may differ in being rotated with respect to a vertical axis 492 by 180 degrees, so that the vertical support frame 450 and the transverse support member 430 together may be selectably placed in the first orientation or the second orientation with respect to the ground-engaging base 490. Compare the first orientation of FIG. 1, suitable for treatment of a right limb of a body, with the second orientation of FIG. 2, suitable for treatment of a left limb of a body. The first limb-support platform 510 is releasably securable to the first link member 110; and the second limb-support platform 530 is releasably securable to the second link member 150. When the vertical support frame 450 is moved from the first orientation to the second orientation, the first limb-support platform 510 is detached from the first link member 110, the support plate 378 is oriented to a side of the first link member 110 opposite the vertical support frame 450, and the first limb-support platform 510 is re-attached to the first link member 110. Similarly, when the vertical support frame 450 is moved from the first orientation to the second orientation, the second limb-support platform 530 is detached from the second link member 150, oriented to a side of the second link member 150 opposite the vertical support frame 450. The first limb-support platform 510 is securable to extend opposite the vertical support frame 450 in the first orientation and is securable to extend opposite the vertical support frame 450 in the second orientation. The first limb-support platform 510 is releasably securable to the first link member 110 to extend from either a first side or an opposite second side thereof, so that the first limb-support platform 510 is securable to extend opposite the vertical support frame 450 in the first orientation and is securable to extend opposite the vertical support frame 450 in the second orientation. The second limb-support platform 530 is releasably securable to the second link member 150 to extend from either a first side or an opposite second side thereof, so that the second limb-support platform 530 is securable to extend opposite the vertical support frame 450 in the first orientation and is securable to extend opposite the vertical support frame in the second orientation.

Referring to FIG. 11, an alternative version of a second limb-support platform 1530 includes a distal pad 1540.

Figure 12:
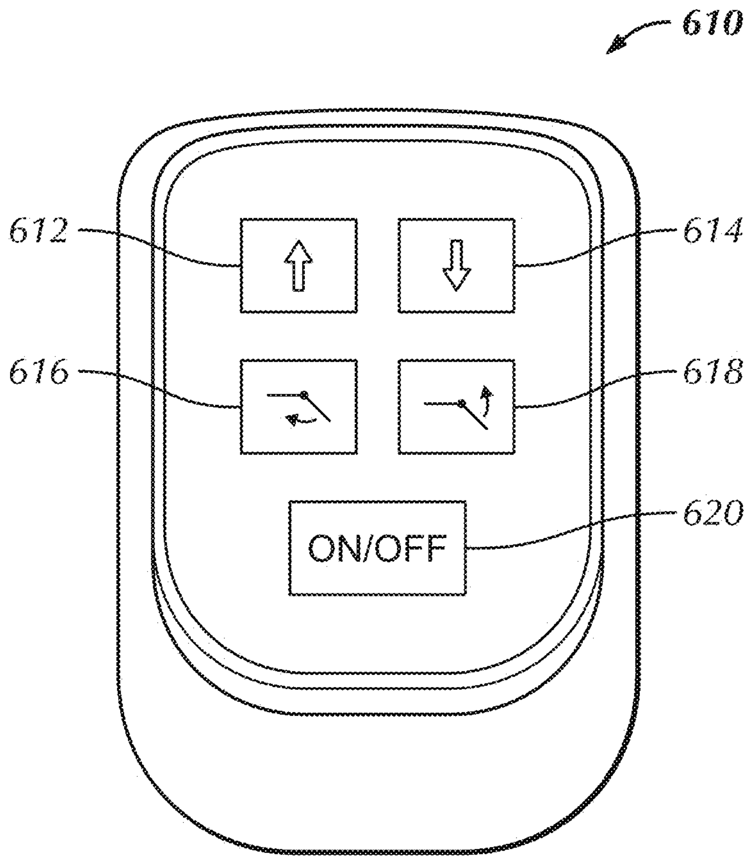
FIG. 12 is a remote for operating the range-of-motion device of FIG. 1.

Referring to FIG. 12, a controller 600 is operatively attached to the flexion-extension actuator 350 to control extension and contraction thereof by supplying corresponding control signals to the flexion-extension actuator 350, thereby controlling the action of the flexion-extension actuator 350 in driving movement of the second link member 150 with respect to the first link member 110. The controller 600 is operatively attached to the raising-lowering actuator 470 to control extension and contraction thereof by supplying corresponding control signals to the raising-lowering actuator 470, thereby controlling the action of the raising-lowering actuator 470 in raising and lowering the support assembly 410. The controller 600 is operatively attached to a remote 610, with the remote having buttons 612, 614 for activating the controller 600 to extend or contract the raising-lowering actuator 470, and buttons 616, 618 for activating the controller 600 to contract or extend the flexion-extension actuator 350. The remote 610 may include an on/off button 620. The controller 600 may be operatively attached to the remote 610 by a wired or wireless connection. The controller 600 may be a simple switch (or a plurality of such switches) configured to provide power to selectively extend or retract or otherwise operate flexion-extension actuator 350 or the raising-lowering actuator 470; or the controller 600 may encompass a microprocessor, micro controller, or other device capable of executing instructions and thereby extending, retracting, or otherwise operating the operate flexion-extension actuator 350 or the raising-lowering actuator 470 (preferably both).

In use, in a method according to the present disclosure, in a first orientation, the range-of-motion device 100 may be operated as follows. A chair, bench, or other seat may be provided for a user. The seat may be shifted so that the main axis 252 is horizontally essentially aligned or aligned with a right-side joint of a user, such as a right-side knee joint. The remote 610 may be used to operate the raising-lowering actuator 470 to essentially align or align the main axis 252 with the right-side knee joint, with the vertical support frame 450 placed to the right of the body of the user. The first link member 110 and the first limb-support platform 510 are secured to an upper limb such as a right-side thigh of the user. The second link member 150 and the second limb-support platform 530 are secured to a lower limb such as a right-side lower leg of the user. The remote 610 may be actuated to flex and extend the right-side knee joint by operating the flexion-extension actuator 350 to drive the intermediate linkage 210 to flex and extend the right-side knee joint of the user. The vertical support frame 450 may be moved from the first orientation to the second orientation, so that the device is configured for treatment of a left-side joint of the user. Changing the orientation of the vertical support frame 450 with respect to the ground-engaging base 490 may be especially common if the range-of-motion device 100 is being provided for in-home use and may be configured for treatment of a particular joint of a particular user. Following a change of orientation from the first orientation to the second orientation (or vice versa), the first limb-support platform 510 and the second limb-support platform 530 are respectively detached from the first link member 110 and the second link member 150, oriented to a side of the second link member 150 opposite the vertical support frame 450, and re-attached.

With respect to the methods and processes described herein, those skilled in the art will recognize that boundaries between the above-described operations are merely illustrative. The multiple operations may be combined into a single operation, a single operation may be distributed in additional operations and operations may be executed at least partially overlapping in time. Further, alternative embodiments may include multiple instances of a particular operation, and the order of operations may be altered in various other embodiments.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present disclosure.

We claim:

1. A range-of-motion device (100) for treating a joint of an elbow, a knee, an ankle, or a wrist of a body by engaging a first limb and a second limb connected by the joint, the range-of-motion device (100) comprising:

- a first link member (110) configured to engage the first limb, the first link member having a proximal end portion (112) and a distal end portion (114), with the distal end portion having a distal gear portion (116);
- a second link member (150) configured to engage the second limb, the second link member having a proximal end portion (152) and a distal end portion (154);
- an intermediate linkage (210) operatively engaged with both the first link member (110) and the second link member (150), the intermediate linkage including:
  - a main shaft (250) non-rotatably attached to the distal gear portion (116) of the first link member (110) such that the main shaft (250) and the distal gear portion (116) are aligned along a main axis (252);
  - a main intermediate link (230) rotatably attached to the main shaft (250), the main intermediate link (230) including a guide track (270);

a bridge shaft (290) rotatably mounted with respect to the main intermediate link; and a bridge link (310) non-rotatably mounted with respect to the bridge shaft to rotate with the bridge shaft, the bridge link having a bridge-link geared portion (312) operatively engaged with the distal gear portion (116) of the first link member (110) and a bridge-link sliding portion (314), the bridge-link sliding portion slidably engaging the second link member (150); and a flexion-extension actuator (350) operatively engaged with the first link member (110) and the intermediate linkage (210) to drive movement of the second link member (150) with respect to the first link member (110).

2. The range-of-motion device (100) of claim 1, wherein the proximal end portion (152) of the second link member includes a track follower (156) operatively engaging the guide track and a second-link sliding portion (158) operatively engaging the bridge-link sliding portion.

3. The range-of-motion device (100) of claim 2, wherein the bridge link includes a bridge-link slot, and the second-link sliding portion (158) of the second link member (150) includes a distal projection (160) slidably engaging the bridge-link slot (316).

4. The range-of-motion device (100) of claim 1, wherein the distal gear portion (116) is integrally formed at the distal end portion (114) of the first link member (110).

5. The range-of-motion device (100) of claim 2, wherein the guide track (270) includes a track slot (270) formed in the main intermediate link (230), and the track follower (156) includes a track-follower projection (156) movable within the track slot (270), and the track slot (270) is configured to move the second link member radially as the bridge link and the second link member rotate with the bridge shaft (290).

6. The range-of-motion device (100) of claim 5, wherein the bridge link includes a bridge-link slot, and the second-link sliding portion (158) includes a projection (160) slidably engaging the bridge-link slot (316).

7. The range-of-motion device (100) of claim 1, wherein the flexion-extension actuator (350) is a linear actuator having a first end portion (352) pivotably attached to the first link member (110) and a second end portion (354) pivotably attached to the main intermediate link (230) to drive the main intermediate link (230) in pivoting movement with respect to the main shaft (250).

8. The range-of-motion device (100) of claim 1, further comprising:

a support assembly (410) operatively engaged with the first link member to support the first link member for free pivoting within a free-pivoting range of motion with respect to the support assembly, the support assembly including:

a vertical support frame (450); and a ground-engaging base (490) supporting the vertical support frame in an upright orientation.

9. The range-of-motion device (100) of claim 8, wherein the vertical support frame (450) includes:

a lower vertical member (452) operatively engaged with the ground-engaging base;

an upper vertical member slidably (454) engaged with the lower vertical member; and a raising-lowering actuator (470) operatively engaged with the lower vertical member and the upper vertical member to extend and retract the upper vertical member with respect to the lower vertical member.

10. The range-of-motion device (100) of claim 1, further comprising:

a base link (370) adjustably securable to the first link member (110); and a support assembly (410) operatively engaged with the base link, the support assembly including:

a transverse support member (430) operatively engaged with the base link to provide support thereto;

a vertical support frame (450) supporting the transverse support member (430); and a ground-engaging base (490) supporting the vertical support frame in an upright orientation.

11. The range-of-motion device (100) of claim 10, wherein the transverse support member is configured to provide free pivoting within a free-pivoting range of motion of the base link with respect to the transverse support member.

12. The range-of-motion device (100) of claim 10, further comprising:

a support collar (434) non-rotatably secured to the transverse support member (430) and having a support-collar slot (436); and wherein the base link (370) is pivotably mounted with respect to the transverse support member (430);

wherein the base link (370) includes a base-link projection (372) engaged with and movable within the support-collar slot (436) so that the base link (370) can pivot within a pivoting range of motion limited by a range of motion of the base-link projection (372) within the support-collar slot.

13. The range-of-motion device (100) of claim 10, wherein the vertical support frame is configured to be removably securable to the ground-engaging base in a first orientation and in a second orientation with respect to the ground-engaging base, the first orientation and the second orientation differing in being rotated with respect to a vertical axis (492) by 180 degrees, so that the vertical support frame and the transverse support member (430) together may be selectably placed in the first orientation or the second orientation with respect to the ground-engaging base.

14. The range-of-motion device (100) of claim 13, further comprising:

a first limb-support platform (510) releasably securable to the first link member (110) to extend from either a first side or an opposite second side thereof, so that the first limb-support platform is securable to extend opposite the vertical support frame in the first orientation and is securable to extend opposite the vertical support frame in the second orientation; and a second limb-support platform (530) releasably securable to the second link member (110) to extend from either a first side or an opposite second side thereof, so that the first limb-support platform is securable to extend opposite the vertical support frame in the first orientation and is securable to extend opposite the vertical support frame in the second orientation.

15. The range-of-motion device (100) of claim 1, further comprising:

a first limb-support platform releasably securable to the first link member (110); and a second limb-support platform releasably securable to the second link member (150).

* * * * *